Figure 1:
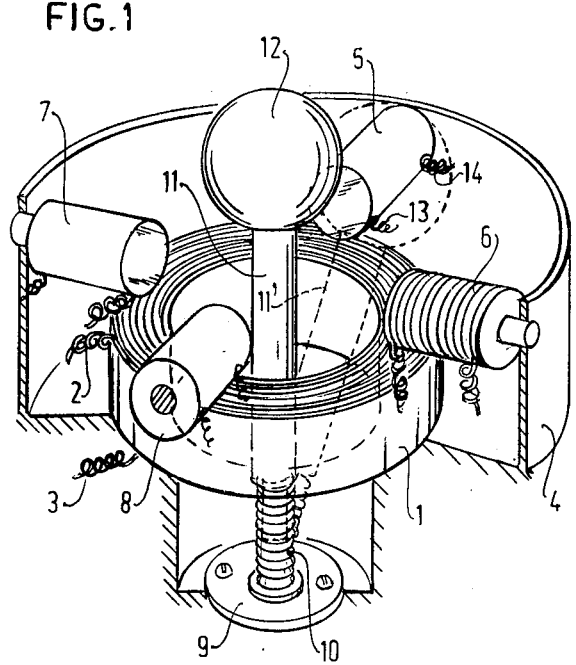

United States Patent [19]

Ruumpol

[11] 4,434,412
[45] Feb. 28, 1984

[54] CONTACTLESS, ELECTRIC CONTROL-HANDLE

[75] Inventor: Geurt J. Ruumpol, Wilp, Netherlands

[73] Assignee: Inductive Control Systems B.V., Ede, Netherlands

[21] Appl. No.: 255,292

[22] Filed: Apr. 17, 1981

[30] Foreign Application Priority Data

May 12, 1980 [NL] Netherlands ..................... 8002727

[51] Int. Cl.³ .......................................... H01F 21/06
[52] U.S. Cl. .................................. 336/134; 336/135
[58] Field of Search ............... 336/30, 130, 132, 133, 336/134, 135

[56] References Cited

U.S. PATENT DOCUMENTS

| | | | |
|---|---|---|---|
| 2,492,731 | 12/1949 | Branson | 336/30 X |
| 2,839,733 | 6/1958 | Bassett | 336/30 |
| 2,864,066 | 12/1958 | Egbert et al. | 336/134 |
| 2,888,635 | 5/1959 | Volk | 336/134 X |
| 2,895,086 | 7/1959 | Pettit | 336/30 X |
| 2,903,663 | 9/1959 | Collina | 336/134 |
| 2,941,140 | 6/1960 | Rudolf, Jr. et al. | 336/30 X |
| 2,944,747 | 7/1960 | Miller | 336/30 X |
| 3,122,970 | 3/1964 | Rhoades | 336/30 X |
| 3,193,784 | 7/1965 | Lautzenhiser | 336/30 |
| 4,177,567 | 12/1979 | Limbach et al. | 336/135 X |

*Primary Examiner*—Thomas J. Kozma
*Attorney, Agent, or Firm*—Diller, Ramik & Wight

[57] ABSTRACT

Contactless, electric control-handle comprising a field coil provided with a core for producing an alternating, electro-magnetic field, pairwise series connected, inductive pick-ups angularly spaced apart and each having a core, and an actuating-rod subjected to a bias stress directed towards a neutral position and connected with a core of the field coil to affect the alternating, electro-magnetic field such that there is a linear relation between the displacement of the actuating rod and the output signal of the inductive pick-ups.

4 Claims, 2 Drawing Figures

CONTACTLESS, ELECTRIC CONTROL-HANDLE

The invention relates to a contactless, electric control handle comprising a field coil provided with a core for producing an alternating, electro-magnetic field, pairwise series-connected inductive pick-ups each having a core and spaced apart by angular distances and an actuating rod subjected to a bias stress directed towards a neutral position and being connected with means intended to affect the alternating, electro-magnetic field. A control-handle of the kind set forth is known from U.S. Pat. Spec. No. 2,903,663.

A drawback of the known control-handle is that there is no linear relationship between the displacement of the actuating member and the magnitude of the voltage measured by the pick-ups. This is due to the fact that upon a displacement of the actuating member the field does not change symmetrically with respect to the pick-ups. A further drawback of the known control-handle is that the construction is complicated. If, as is proposed in said U.S. patent specification, the means affecting the alternating, electro-magnetic field are constructed in the form of an armature displaceable above the pick-ups and the field coil leaving free an air gap, care has to be taken that the air gap is accurately maintained in order to obtain a given relationship between the displacement of the actuating rod and the magnitude of the measured voltage.

The invention has for its object to provide a solution for said problem.

This is achieved in that the means affecting the alternating electro-magnetic field are formed by the core of the field coil. In this way invariably a field change is produced symmetrically to the pick-ups in a manner such that an increase in the voltage of one pick-up of a pair is proportional to a decrease in the voltage of the other pick-up of one pair. By comparing the phase of the voltage of pairwise coupled pick-ups with the phase of the voltage at the coil an indication is, in addition, obtained of the direction in which the means varying the field have been displaced. The construction of the control-handle according to the invention is simple, since the sole displaceable element is the core of the field coil. The fulcrum of the core may be located in or below the field coil. The pick-ups are preferably spaced apart by an angular distance of 90°. The cores of the inductive pick-ups are preferably adjustable. This permits of readily setting the device in zero position.

The invention will be described more fully with reference to the drawing of an embodiment.

Figure 2:
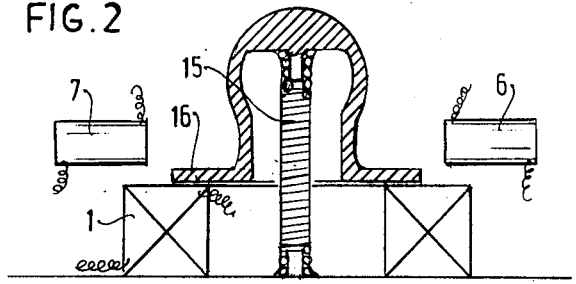

FIG. 1 is a perspective view of the control-handle in accordance with the invention and FIG. 2 is a cross-sectional view of an alternative embodiment.

The coil 1 comprises connecting wires 2 and 3 for connection to an alternating-current source. When current passes the coil 1 will build up an electro-magnetic field. A frame 4 is provided with inductive pick-ups, 5,6,7 and 8 spaced apart by angles of 90° and dividing the measuring plane parallel to the coil 1 into quadrants. A base plate 9 of the frame is provided with a core formed by a rod 11 biassed by a spring 10 towards the neutral medium position. At the upper end the rod 11 has a control-knob 12. By displacing the metal core from the neutral position for example, to the position indicated by broken lines, the electro-magnetic field is varied in a sense such that at the pick-ups 5 and 6 the field becomes stronger and at the pick-ups 7 and 8 weaker. Therefore, the voltage induced in the pick-ups also varies. The voltage is picked up with the aid of the leads, for example, 13 and 14 of the pick-up 5. By evaluating the measuring voltages of the pick-ups both the direction and the extent of the displacement of the core 11 can be derived.

FIG. 2 shows an embodiment differing from that of FIG. 1 in that a plate-shaped metal body 16 is fastened to the displaceable rod 15, by which the electro-magnetic field can be varied basically in the same manner as in the embodiment of FIG. 1.

What we claim is:

1. A contactless electric control device comprising:
    a generally annular field coil presenting an open central region and including means connecting it to an alternating current source for producing an alternating magnetic field whose instantaneous lines of magnetic flux extend longitudinally through said open central region;
    a plurality of inductive pick-ups disposed in coplanar relation in spaced relation to one end of said field coil, the plane containing said pick-ups being perpendicular to the longitudinal axis of said open central region of the field coil, said longitudinal axis being the axis of said field coil and each pick-up including a core extending radially with respect to such longitudinal axis with the inner end of each such core being disposed radially beyond such open central region, said cores being angularly spaced within said plane around said longitudinal axis, each pick-up also including a winding on its core and opposed pairs of such windings being connected in series; and
    movable core means projecting at least in part longitudinally into said central region generally along said longitudinal axis and in radially inwardly spaced relation to said field coil for affecting said alternating magnetic field such that there is a linear relation between displacement of said core means and output signals produced by said opposed pairs of windings.

2. A control device as defined in claim 1 including a coil spring normally projecting along said longitudinal axis; one end of said coil spring being anchored and the other end being connected to said core means whereby the coil spring may be flexed with the anchor point as pivot.

3. A control device as defined in claim 1 including a coil spring normally projecting along said longitudinal axis, one end of said coil spring being anchored and wherein said core means comprises a rod attached to the free end of said coil spring and projecting through said open central region.

4. A control device as defined in claim 1 wherein there are four pick-ups disposed at 90° intervals in said plane.